United States Patent [19]
Grasko

[11] 3,852,076
[45] Dec. 3, 1974

[54] AQUEOUS METHOD OF MICROENCAPSULATION AND CAPSULES

[75] Inventor: Stephen Charles Grasko, Los Angeles, Calif.

[73] Assignee: John W. Ryan, Los Angeles, Calif.

[22] Filed: Feb. 22, 1972

[21] Appl. No.: 228,270

[52] U.S. Cl............... 106/26, 106/24, 106/30, 106/79, 106/81, 106/84, 106/170, 106/204, 106/209, 106/214, 106/287 S, 252/313 R
[51] Int. Cl...... C09d 11/14, C09d 1/04, C09d 3/12
[58] Field of Search .............................. 106/20–32, 106/74, 79, 80, 81, 84, 170, 287 S; 252/309, 313 R, 316

[56] References Cited
UNITED STATES PATENTS

| 3,016,308 | 1/1962 | Macaulay | 106/20 X |
| 3,336,155 | 8/1967 | Rowe | 117/100 C |
| 3,458,328 | 7/1969 | Zola | 106/81 X |
| 3,575,882 | 4/1971 | Vandegar et al. | 106/20 X |
| 3,692,690 | 9/1972 | Horger | 252/316 |
| 3,725,089 | 4/1973 | Zola | 106/81 X |

Primary Examiner—Joseph L. Schofer
Assistant Examiner—T. S. Gron
Attorney, Agent, or Firm—Michael Dufinecz

[57] ABSTRACT

A capsule comprising a core which includes polar group affording organic material (and non-reactive material) and a membrane reaction product of inorganic silicate and polar groups of the core polar group affording organic material.

A method of forming water insoluble particles (capsules) by commingling polar group affording material, alone or conjoined with non-reactive material, and an aqueous colloidal solution of inorganic silicate to form capsules within a continuous aqueous phase. The inorganic silicate is capable of being placed into aqueous colloidal solution. The polar group affording organic material is selected from (i) simple organic compounds having at least one polar group, (ii) organic hydrophilic compounds, and (iii) water emulsion polymer latexes containing either (i) or (ii) but excluding water soluble cellulose ether hydrophilic colloids, which materials also form capsules when used in a standard procedure with a standard hectorite type clay colloidal solution.

46 Claims, No Drawings

3,852,076

AQUEOUS METHOD OF MICROENCAPSULATION AND CAPSULES

BACKGROUND OF THE INVENTION

1. Field of the Invention

This invention relates to microencapsulation and specifically to microencapulation utilizing an aqueous system. Also this invention relates to capsules provided with a particular type of capsule membrane.

2. Reference to the Prior Art

A broad statement in summary of this art is given in Volume 13 pp. 436–456, Encyclopedia of Chemical Technology, 2nd Edition, (Kirk-Othmer), *Microencapsulation*. Pertinent to the formation of water insoluble particles, especially mixtures of colored particles, in a continuous aqueous medium are John C. Zola U.S. Pat. No. 3,458,328 and Belgium Pat. No. 735,138.

SUMMARY OF THE INVENTION

Encapsulation Method

A method of forming water insoluble particles (capsules) which method comprises: commingling polar group affording organic material and an aqueous colloidal solution of inorganic silicate, said inorganic silicate being present in an amount at least sufficient to react with polar groups of said polar group affording organic material to form water insoluble particles within a continuous aqueous phase, said particles having a size above colloidal dimensions.

The inorganic silicate is characterized by the ability to be placed into aqueous colloidal solution, such as, water soluble alkali metal silicate and montmorillonite clay, particularly the hectorite and saponite types and especially the synthetic hectorites and saponites.

The polar group affording organic material is characterized by the ability to form water insoluble particles having a size above colloidal dimensions when added to an aqueous colloidal solution of synthetic lithium hectorite clay and tetra sodium pyrophosphate peptizing agent, with commingling; and is selected from the class consisting of (i) simple organic compounds having at least one polar group, (ii) organic hydrophilic colloids, and (iii) water emulsion polymer latexes containing at least one material from (i) and (ii), excluding the water soluble cellulose ether hydrophilic colloids.

An alternate definition of the class from which the polar group affording organic material is selected is:

(a) simple organic compounds having at least one polar group; (b) water soluble alkali metal carboxyalkylcellulose and water soluble alkali metal carboxyalkylhydroxyalkylcellulose; (c) water soluble polysaccharides; (d) water soluble proteins; (e) the water soluble resins: poly(vinyl alcohol), poly(ethyleneimine), poly(acrylamide), polyvinylpyrrolidone, sulfonated polymers, carboxylic polymers, their esters and their alkali metal salts, and maleic copolymer derivatives; (f) water emulsion polymer latexes containing material from at least one of the above sub-classes (a) through (e); and (g) water soluble cellulose ethers.

Desirably the simple organic compounds have insubstantial solubility in water at ordinary temperatures.

Preferably the polar group affording organic material is added with a material which is non-reactive with the inorganic silicate, especially an aqueous material. The non-reactive material may be particulate — solid, semisolid or liquid — such as a water emulsion polymer latex or paint formulation, a fluorinated hydrocarbon polymer (Teflon or Kel-F), a ceramic frit, a liquid hydrocarbon, essential oil, or ink.

Capsules (Water Insoluble Particles)

A capsule consisting essentially of a core including as the essential component polar group affording organic material and enclosing said core a membrane consisting essentially of an inorganic silicate reacted with polar groups of said polar group affording organic material, said capsule having a size above colloidal dimensions.

The polar group affording organic material, the inorganic silicate, and other core materials are as defined above in "Encapsulation Method."

DESCRIPTION OF THE INVENTION AND EXAMPLES

The Polar Group Affording Organic Material

Not every polar group affording organic material is suitable for use in this invention. Only those polar group affording organic materials are suitable which react with inorganic silicate that is in aqueous colloidal solution to form water insoluble particles. For example, the lower molecular weight aliphatic alcohols, especially those having high solubility in water, do not react to form water insoluble particles; indeed, these compounds appear to solubilize the silicates. The ethylene oxide polymers(polyethylene oxide) do not react to form water insoluble particles; it is thought the terminal hydroxy groups of the polymer cannot react with enough silicate to overcome the solubilizing effect of the ether groups in the polymer.

It has been observed that cellulose derivatives may or may not react to form water insoluble particles. It is thought that steric hindrance may be the reason for this failure.

It has been observed that latexes of organic polymers containing polar groups do not react with inorganic silicate to form water insoluble particles; these non-reactive latexes are free of reactive protective colloids. It is thought that these solid or semisolid particulate materials do not have enough surface polar groups exposed to be able to react with enough of the inorganic silicate to form the water insoluble particles, at least, a water insoluble particle having a size above colloidal dimensions. These latexes are aqueous colloidal dispersions, conventionally referred to as water emulsion polymer latexes.

It is thought that because the inorganic silicates in aqueous colloidal solution form a sort of network with reactive sites distributed thereon, the polar group affording polymers, or even macromolecules, may or may not be able to react to form water insoluble particles; reaction seems to be dependent on the spacing of the polymer polar groups, and also on steric hindrance. In some the polar group spacing is too far out of line with the reactive sites of the inorganic silicate to permit enough reaction to form the water insoluble particle.

The operative polar group affording organic materials cannot be defined merely by naming classes of polar group affording organic materials; each class contains some members that do not react with the inorganic silicate in aqueous colloidal solution to form water insoluble particles.

A simple screening procedure has been devised for determining whether or not a particular polar group affording organic material will react with inorganic silicate in aqueous colloidal solution to form water insoluble particles. Using this combination of the exclusionary screening procedure and the class names of probably operative polar organic materials, it can be readily determined whether a particular polar group affording organic material comes within the instant invention.

In one definition, the polar groups affording organic material of this invention is characterized by (1) the ability to form water insoluble particles having a size above colloidal dimensions when added to an aqueous colloidal solution of synthetic hectorite type clay and tetra sodium pyro phosphate peptizing agent, with commingling, and (2) having been selected from the class consisting of (i) simple organic compounds having at least one polar group, (ii) organic hydrophilic colloids, and (iii) water emulsion polymer latexes containing at least one material from (i) and (ii), excluding the water soluble cellulose ether hydrophilic colloids.

In another form of "named class" definition (of equal scope with the earlier definition) the reactive polar group affording organic materials are selected from the class consisting of (a) simple organic compounds having at least one polar group; (b) water soluble alkali metal carboxyalkylcellulose and water soluble alkali metal carboxyalkylhydroxyalkylcellulose; (c) water soluble polysaccharides; (d) water soluble proteins; (e) the water soluble resins: poly(vinyl alcohol); poly(ethyleneimine); poly(acrylamide); polyvinylpyrrolidone; sulfonated polymers; carboxylic polymers, their esters and their alkali metal salts; and maleic copolymer derivatives; (f) water emulsion polymer latexes containing material from at least one of the above sub-classes (a) through (e); and (g) water soluble cellulose ethers.

Desirably, the simple organic polar compounds are further characterized by insubstantial solubility in water at ordinary temperatures. In general, the method of the invention will be carried at ordinary temperatures of about 60° – 110°F. Insubstantial solubility or immiscibility appears to aid in the formation of water insoluble particles when the polar compound is added to the aqueous colloidal solution of silicate.

"Water soluble" when used herein as part of the name of a polar group affording organic material is intended to be understood as used in the hydrophilic colloid art, that is, those materials forming colloidal solutions or stable swollen dispersions in water. In the main these materials have solubilities up to about 5 weight percent; some dissolve to a greater extent. For example, gum arabic and polyvinylpyrrolidone dissolve to the extent of 50 percent.

Water soluble polysaccharides are included herein in the understanding of the hydrophilic colloid art. This grouping includes starch and its chemically modified forms, such as, carboxymethylstarch, hydroxyethylstarch, and hydroxypropylstarch; pectin; the plant gums, such as, arabic, guar, tragacanth, larch, karaya, and locust bean; the marine polysaccharides, such as, agar, alginate and carrageenan; fully synthetic polysaccharides with properties similar to the natural gums are now available and are included herein.

Water soluble proteins are included herein as understood in the colloid art; gelatin and casein are the best known.

Poly(vinyl alcohol), poly(ethyleneimine), poly(acrylamide), and polyvinylpyrrolidone are well known hydrophilic colloids and are available in many molecular weights.

Carboxylic polymers, their esters and alkali metal salts are available from polyacrylic acid, polymethacrylic acid, polyethacrylic acid, and hydrolysis products of maleic copolymers. Alkali metal salts are available as produced from polymers such as poly(acrylamide) and poly(acrylonitrile).

Maleic copolymer derivatives provide water soluble polar polymers such as half-amides and half-esters, available commercially.

Sulfonated polymers are available from the sulfonation of insoluble polymers or from polymerization of monomers having sulfonate groups.

The water soluble alkali metal carboxyalkylcellulose is exemplified by the sodium carboxymethycellulose (commonly refered to as CMC) and sodium carboxyethylcellulose. The water soluble alkali metal carboxyalkylhydroxyalkylcellulose is exemplified by sodium carboxymethylhydroxyethylcellulose. Commonly "alkyl" in these cellulosics has 1–3 carbon atoms. (Because of the presence of the carboxy groups, these cellulosics are not considered to be cellulose ethers.)

Water soluble cellulose ethers as used herein are hydrophilic colloids of the type alkylcellulose and hydroxyalkylcellulose and hybrids of these two. Exemplary are methylcellulose, ethylcellulose, methylethylcellulose, hydroxyethylcellulose, ethylhydroxyethylcellulose, and methylhydroxypropylcellulose. Commonly alkyl in the cellulose ethers has 1–3 carbon atoms.

A special polar group affording organic material of this invention is a mixture of water emulsion polymer latex and at least one of water soluble polysaccharide, water soluble protein, poly(vinyl alcohol), poly(ethyleneimine), poly(acrylamide), polyvinylpyrrolidone, carboxylic polymers, their esters and their alkali metal salts, maleic copolymer derivatives, sulfonated polymers, water soluble alkali metal carboxyalkylcellulose, water soluble alkali metal carboxyalkylhydroxyalkylcellulose, simple organic compounds having at least one polar group.

This special mixture is also defined as a mixture of water emulsion polymer latex and at least one simple organic compound having at least one polar group and organic hydrophilic colloid but excluding the water soluble cellulose ether hydrophilic colloids.

Of particular commercial interest are the rubber base paints, wherein the water emulsion polymer latexes are based on various modifications of
1. Polystyrene, plasticized and unplasticized
2. Poly(styrene-butadiene) copolymers
3. Poly(vinyl acetate) type
4. Polyacrylic type These four polymeric film-forming materials are refered to in the trade as:
1. Polystyrene type
2. Styrene-butadiene type
3. PVA type
4. Polyacrylic type Some latexes are protected by surfactants which do not react with the inorganic silicate; anyone of the defined polar group affording organic materials may be added to such a latex to obtain the formation of the desired water insoluble particles. Other latexes contain protective hydrophilic colloids which do react with the inorganic silicate. Should more of the polar group affording material be need than present in the latex, the specific material or any one of the compatible defined polar organic materials may be added in order to obtain the formation of the desired water insoluble particles.

As used herein, water emulsion polymer latex may be the latex as is, or it may be a partial or complete rubber base formulation, including polymeric film-former, pigments, extenders, etc.

Also suitable for use in the invention are the simple organic compounds having at least one polar group, which react with the inorganic silicate to form water insoluble particles. The simple organic compounds are distinguished from the macromolecules and polymers. Preferred polar groups are hydroxyl and carboxyl.

Desirably the simple organic compounds have insubstantial solubility in water at ordinary temperature, that is, readily form a separate organic compound phase distinct from the aqueous colloidal solution.

However some compounds having substantial solubility in water may be useful in situations when a non-polar water immiscible material is to become a part of the water insoluble particle. The polar compound must be preferentially soluble in the non-polar water immiscible material.

Illustrative groups of simple organic polar compounds are the aliphatic alcohols, monohydric, dihydric and polyhydric; the lower aliphatic carboxylic acids and the fatty acids. The aliphatic and aromatic sulfonic acids and salts. The aliphatic and aromatic amines and amides. And esters and salts of these groups.

"Organic hydrophilic colloid" as used herein is intended to mean: any organic compound capable of forming stable suspensions in water of particles having colloidal dimensions — smaller than one micron — or capable of forming colloidal solutions.

The Screening Procedure, Including Illustrations

The screening procedure utilizes a standard clay colloidal solution; this clay has been observed to react rapidly at ordinary room temperature with commingling or simple spatula stirring of the 'test' polar group affording organic material. Visual observation of the contents of the bottle in which the test is performed is sufficient to show the formation of water insoluble particles of greater than colloidal size.

The standard aqueous colloidal solution is made up as follows: One part by weight of tetrasodium pyrophosphate peptizing agent is dissolved in 90 parts by weight of water; then 9 parts by weight of Baroid synthetic lithium hectorite type clay is added to the peptized water; the solution and clay are agitated for 8 hours with a Cosles blade at about 1,000 rpm to ensure the formation of an aqueous colloidal solution of the clay; 40 weight parts of the total solution are then blended with 60 weight parts of water to form the standard clay solution. the standard clay solution consists of, in weight percent, water, 96.0; clay, 3.6; and tetrasodium pyrophosphate, 0.4; the standard solution is translucent with a faint bleached straw color.

The Baroid Division National Lead Company synthetic lithium hectorite type clay used as the standard clay has the following analysis: $SiO_2$, 56.2%; MgO, 29.2%; $Li_2O$, 2.3%; $Na_2O$, 0.6%; CaO, 0.4%; F, 1.8%; and ignition loss, 11.4%. Base exchange capacity (meq/100g) is 60–70. Color and appearance; white, fine powder. Screen analysis: −200 mesh. Bulk density: 60 lb/cu ft. pH of a 15 centipoise slurry is 9.5. It has been observed that clay deviating somewhat from the foregoing analysis can be used in the screening procedure with completely satisfactory results.

In the screening procedure of the instant invention, 100 cc of the standard clay solution is placed in a bottle, typically a screw cap bottle of about 300 cc volume. Then about 25 cc of the particular polar material is added to the bottle. If the particular polar material is a liquid, it is added "as is." If the particular polar material is a solid, it is dissolved in water and 25 cc, sometimes 50 cc, is added to the bottle. Usually the commingling imparted by the pouring of the test material into the bottle is enough to give formation of water insoluble particles; ordinarily the mixture in the bottle is stirred with a spatula. In most cases, visual observation shows the presence of water insoluble particles; viewing the liquid wetted interior surface of the bottle by transmitted light shows the presence of very small insoluble particles, or overcomes the effect of a colored aqueous solution, or confirms the absence of insoluble particles.

Illustration I: Particle Formation Using Hydroxyethylcellulose.

Hydroxyethylcellulose (Cellosize QP4400, Union Carbide Corp) was dissolved in water to give a 2 wt. percent solution; this was a transparent, water-white liquid. 50 cc of the 2 percent solution was poured into 100 cc of the standard clay solution and gently stirred with a spatula. Immediately the visual appearance of the bottle contents changed to a turbid gray slurry. After turning the bottle sideways gray strands were observed on the wetted glass surface. These strands on close inspections were a gray-tan color, 2–3 mm wide, and 6–15 mm long. The water insoluble strands drifted in the continuous aqueous phase and settled very slowly. During shelf storage, there was no detectable merging of the strands; they retained their discrete nature.

Illustration II. Using Pigments and Hydroxyethylcellulose.

a. Brown pigment dispersion

A standard brown pigment dispersion was prepared by glass bead milling of the following: 510 g. of water; 48.3 g. of Rohm & Haas Tamol 850F surfactant (a non-polar material); 1.5 g. Hercules 12M31P sodium carboxymethylcellulose, used here as a dispersing agent; and 1,000 g. of Brown Oxide No. 640 (Frank B. Davis Co.). After milling, the dispersion appeared to be a uniform brown color.

b. Blue Pigment Dispersion

A standard blue pigment dispersion was prepared by glass bead milling the following: 900 g. of water; 100 g. of Tamol 850F; 3 g. of 12M31P sodium CMC; and 2,000 g. of Ultramarine Blue No. 410B (Frank B. Davis Co.). After milling, the dispersion appeared to be a uniform blue color.

c. Brown Hydroxyethylcellulose Dispersion 10 weight parts of the brown pigment dispersion was blended with 90 weight parts of the 2 percent Cellosize QP4400 solution prepared in Illustration I. The blend was a uniform brown colored liquid.

d. Blue Hydroxyethylcellulose Dispersion 10 weight parts of the blue pigment dispersion was blended with 90 weight parts of the 2 percent Cellosize QP4400 solution prepared in Illustration I. The blend was a uniform blue colored liquid.

e. Preparation of a Slurry of Brown colored water insoluble particles 25 cc of the brown hydroxyethylcellulose dispersion was poured into 100 cc of the standard clay solution. Immediately, as the pouring proceeded, fine brown colored particles, roughly spheroidal in shape, appeared in the aqueous phase. The brown insoluble particles settled very slowly on standing to form a loose compact mass, which mass was easily dispersed into the aqueous phase by gentle shaking of the bottle.

When the bottle contents were viewed by transmitted light, the brown particles had a sharp surface separation from the clear liquid surrounding the particle; clearly seen was a thin layer at the edge of the particle, which layer was a part of the particle but did transmit light differently giving a halo effect to the particle. The continuous liquid phase had no brown coloring; rather it had a very faint straw color — fainter than the standard solution color.

f. Preparation of a Mixture of Brown particles and of Blue particles 25 cc of the blue hydroxyethylcellulose dispersion was poured into slurry obtained in (e) above and bottle contents gently stirred with a spatula. Quickly blue particles appeared among the brown particles. The blue particles were about the same size and shape and had the same halo surface effect as the brown particles.

On standing there was no evidence or merging of blue and brown particles; the particles maintained their discrete nature. Also there was no tendency toward agglomeration and the settled brown and blue colored particulate mass readily separated into a mobile slurry when the bottle was gently shaken.

The size and shape and the halo effect was evident by turning the bottle and looking at the wetted glass surface on which the colored particles slid, within the layer of aqueous phase.

Both the brown and the blue colored particles showed the light colored thin layer surface enclosing the blue or brown colored core within. This appearance was maintained during prolonged storage. The colored particles act like capsules with the pigment forming a distinct core and the halo thin layer forming a membrane enclosing the colored core.

Illustration III. Insoluble Particles from an Ester-Alcohol.

a. In this Illustration the polar material was an ester-alcohol Texanol (Dow Chemical Co). Texanol is a water immiscible transparent colorless liquid having 12 carbon atoms; it is believed to be a half-ester of an 8 carbon atom alkanediol (octanediol mixture) and a 4 carbon atom alkanecarboxy acid (butyric acid). Texanol was agitated with water and the mixture allowed to settle; promptly two separate sharp layers appeared in the bottle; Texanol above and clear water below.

b. Water insoluble particles from Texanol 25 cc of Texanol were poured into 100 cc of standard clay solution; immediately spheroids formed within the bottle; after standing a short time, the spheroids rose to the surface of the liquid in the bottle to form a layer of spheroids. These ranged in diameter from about 2 mm to about 8 mm. All the Texanol seemed to be taken up into the spheroids, most of which were spheres.

The lower aqueous phase had much the appearance of the standard clay solution. However, examination of the bottle by transmitted light showed the aqueous phase extended among even the topmost layer of spheroids and separated the individual spheroids.

Even by reflected light it was evident that the spheroids consisted of two portions: a core that looked like Texanol and a fairly thin, faintly tan colored, transparent membrane enclosing the core. By transmitted light, the membrane became a shimmery, almost sparkling, halo enclosing a colorless liquid. The larger spheroids gave the more pronounced difference between the membrane and the core, in terms of light differentiation effect. In these larger spheroids, the core and bulk Texanol had the same appearance by transmitted light.

The spheroid capsules retained their separate discrete nature or storage. Gentle shaking of the bottle dispersed the capsule layer into the aqueous phase. When the shaking was stopped, the capsules quickly rose to the top of the liquid phase.

The capsules could be separated from the liquid phase and dried at ordinary temperature to form free flowing spheroidal capsules.

Illustration IV. Insoluble Particles from Texanol and Mineral Spirits.

a. 25 cc of paint thinner grade petroleum mineral spirits (saturated aliphatic hydrocarbons) was poured into 100 cc of the standard clay solution; the bottle was shaken and nothing happened. As the shaking ceased, the contents separated into two distinct layers. Each layer looked like the material before any shaking of the bottle. There was no evidence of any reaction.

b. Mixed Texanol and Mineral Spirits

Equal volumes of Texanal and of Mineral Spirits were blended to form a solution. 50 cc of this Texanol-mineral Spirits solution was poured into 100 cc of standard clay solution. Immediately spheroids appeared in the liquid phase. After gently shaking the contents, the contents were allowed to settle. Spheroids of about the same size range as Texanol rose to the top of the liquid in the bottle. Inspection showed all of the Texanol-Mineral spirits solution had passed into the spheroidal particles. Inspection by transmitted light showed that the aqueous phase extended about the spheroids to the top of the contents of the bottle.

Inspection by transmitted light showed that the spheroids had membranes enclosing the core which membranes appeared to be identical to the membranes present when Texanol alone had been encapsulated — Illustration III.

Illustration V. Mixed Pigmented Partices with Locust Bean Gum as the Polar Organic Material.

a. A 1.5 weight percent water solution of locust bean gum was prepared. This solution had a pale yellow color.

b. Brown colored dispersion 10 weight parts of the brown pigment dispersion of Illustration II was blended with 90 weight parts of the 1.5 percent locust bean gum solution. This blend was a uniform brown color.

c. Blue colored dispersion 10 weight parts of the blue pigment dispersion of Illustration II was blended with 90 weight parts of the 1.5 percent locust bean gum solution. This blen was a uniform blue color.

d. Brown water insoluble particles 25 cc of the brown colored dispersion was poured into 100 cc of the standard clay solution. Immediately large irregular brown masses formed within the liquid.

After settling, the brown masses moved to the bottom of the bottle; these were so large and irregular that much open space was available among the masses; they did not change shape after settling and retained their irregular configurations. Inspection by transmitted light showed that all of the brown pigment had passed into the brown masses (brown water insoluble particles). Also that each brown particle was surrounded by a continuous aqueous phase.

The brown particles were very irregular in shape, ranging from cubular, somewhat distorted, to elongated planar bodies about 6 mm thick. Some of the larger cube were about 15–20 mm on a side. In general the more compact particles ranged in size from 5×5×5 mm to about 10×30×6 mm. Some of the particles had tendrils adhered to the central mass.

Transmitted light showed a thin halo membrane enclosing the brown colored core of the particles. Also the tendrils showed the thin halo membrane enclosing the core of the tendril.

e. Mixture of Brown Masses and Blue Masses 25 cc of the blue colored dispersion was poured into the mixture of brown masses and clay solution. Immediately, large irregular blue masses formed within the liquid; these were discrete particles completely separate from the brown particles. All the particles settled to the bottom when the shaking was stopped. On standing the particles maintained their irregular configurations and there was no evidence of merger of brown and blue particles even at the points where the two particles seemed to touch. Actually, transmitted light showed a "film" of liquid phase separating the two particles.

Transmitted light showed the thin membrane enclosing the core of the blue particles and of the brown particles. Because of the large sizes of the blue and the brown particles, the continuous phase could be seen to have a very pale straw color — much like the standard clay solution — some what paler straw color, though.

The size and shape of the capsules formed with locust bean gum indicate that the reaction between the locust bean gum and the clay proceeds so rapidly that the enclosed core is frozen at the size of the drop of dispersion entering the clay solution. The membrane is strong enough to maintain the original irregular shape. The degree of commingling as the gum dispersion enters the clay solution, and the amount of gum present, also determine the size and shape of the water insoluble particles formed.

Illustration VI. No Encapsulation Using Polar Material.

a. A 5 weight percent solution in water of Polyethylene Oxide (PolyOx WSRN80, Union Carbide) was prepared.

b. Brown colored dispersion.

10 weight parts of the brown pigment dispersion of Illustration II was blended with 90 weight parts of the PolyOx solution. The blend was a uniform brown color.

c. Blue colored dispersion 10 weight parts of the blue pigment dispersion of Illustration II was blended with 90 weight parts of the PolyOx solution. The blend was a uniform blue color.

d. Attempted brown capsule formation. 25 cc of the brown colored dispersion was poured into 100 cc of the standard clay solution and this stirred. Inspection of the mixture showed no particle formation; a uniform brown colored liquid had been produced.

e. Attempted blue capsule formation. 25 cc of the blue colored dispersion was poured into the mixture of PolyOx brown solution and clay solution and the the bottle shaken vigorously. There was no evidence of blue water insoluble particles. The blend had changed to a gray color owing to the intermingling of the blue and the brown pigments.

Settling of the contents of the poured produced a thin bottom layer of mixed blue and brown pigment fines; the liquid was gray in color.

Illustration VII. Another Non-Reactive Polar Material.

An attempt was made to encapsulate a liquid, sulfonated vinyltoluene (Dow Chemical Co. ET–460-4) having a large solubility in water. 25 cc of ET–460-4 was poured into 100 cc of the standard clay solution. The two liquids merged into a single solution. There was no evidence of water insoluble particle formation.

Illustration VIII. Still Another Non-reactive Polar Material.

An attempt was made to encapsulate Irish Moss, a plant gum. A water solution containing 1.5 Wt. percent Irish Moss was prepared. Using the regular 10/90 proportions, a brown colored dispersion and a blue colored dispersion were prepared. Addition of the brown dispersion, in the regular 25/100 proportions, to the standard clay solution did not produce any water insoluble particles. Addition of blue dispersion did not produce any insoluble particles. The contents of the bottle was a uniform gray colored liquid.

The standard screening procedure requires that the polar material be added to the standard clay solution. This has been done in order to permit the formation of water insoluble particles from two or more differently colored dispersions whereby a mixture of particles providing discrete bodies colored according to the dispersion from which the body was obtained. In other words a multicolor dispersed particle system is obtained by pouring the colored aqueous system into the clay containing system. When such color separation is not essential, or the system is not colored, at least not intentionally colored in a particular fashion, the order of addition is not critical. Texanol because of its transparency and the large spheroids formed is ideal for showing the effect of order of addition; tests with Texanol and the standard clay solution showed identical results regardless of order of addition.

The Inorganic Silicates

The inorganic silicates used in this invention are characterized by the ability to be placed into aqueous colloidal solution.

It has been observed that those inorganic silicates which form true solutions in water do not react with polar group affording organic materials to form water insoluble particles. Also it has been observed that the finely divided silicas which can thicken water by the formation of hydrates do not react with polar group affording organic materials to form water insoluble particles.

Some inorganic silicates form stable colloidal solutions directly, without the use of a peptizing agent. Most inorganic silicates require a peptizing agent be present in the aqueous medium for the formation of an aqueous colloidal solution by the inorganic silicate. (In the colloid art, the presence of a peptizing agent is so normal, that its pressure in the colloidal solution is rarely specified.)

Peptizing agents commonly used with inorganic silicates, and particularly with clays, are ammonia, hydrogen peroxide, sodium carbonate, sodium citrate, sodium hydroxide, sodium oxalate, sodium silicate, sodium hexametaphosphate, sodium tripolyphosphate, and tetrasodium pyrophosphate. It is to be understood the invention is not limited to the use of the above enumerated agents.

Those clays, either natural, or chemically modified natural, or synthetic, which can be placed into aqueous colloidal solution are outstanding inorganic silicates for use in this invention. Of the clays, it is advantageous to use the montmorillonite group of clays; these include montmorillonite, beidellite, nontronite, hectorite, saponite and sauconite. The preferred clays are hectorite type and saponite type. Fully synthetic hectorite type clays are available from LaPorte Industries and from Baroid Division National Lead Company. Chemically modified hectorite clay and synthetic saponite type clay are available from Baroid.

A typical formula for a hectorite clay is given in Encyclopedia of Chemical Technology, 2nd Ed., Vol. 5, page 547:

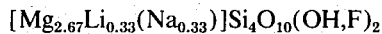

$[Mg_{2.67}Li_{0.33}(Na_{0.33})]Si_4O_{10}(OH,F)_2$

Synthetic hectorite clays are available which contain no fluorine.

In Table I there is given the chemical analyses of six hectorite clays. No. 1 is taken from Ency. Chem. Tech. 2nd Vol 5, p 548. No. 2 is a "90 percent content" natural hectorite sold by Baroid under the tradename MACALOID. Nos. 3 and 4 are synthetic clays sold by Baroid. Nos. 5 and 6 are synthetic clays sold by LaPorte.

Table I.

| Component as Wt % | Hectorite Clays | | | | | |
|---|---|---|---|---|---|---|
| | 1 | 2 | 3 | 4 | 5 | 6 |
| $SiO_2$ | 55.9 | 51.9 | 56.2 | 56.1 | 55.9 | 60.4 |
| MgO | 25.0 | 22.1 | 29.2 | 28.4 | 26.7 | 26.0 |
| $Li_2O$ | 1.1 | 1.2 | 2.3 | 0.5 | 1.9 | 1.1 |
| $Na_2O$ | 2.7 | 3.1 | 0.6 | 3.5 | 4.3 | 3.0 |
| F | 6.0 | 2.1 | 1.8 | 1.6 | 8.3 | 0.0 |
| CaO | 0.0 | 6.5 | 0.4 | 0.3 | 0.1 | 0.2 |
| $Fe_2O_3$ | 0.0 | 0.3 | 0.0 | 0.0 | 0.0 | 0.0 |
| $Al_2O_3$ | 0.1 | 0.8 | 0.0 | 0.0 | 0.0 | 0.0 |
| Ignition loss | 12.1 | 11.7 | 11.4 | 9.5 | 3.6 | 6.9 |

A typical formula for a natural saponite clay, as given in Ency. Chem. Tech. 2nd Vol 5, p 547, is:

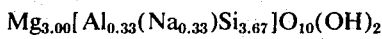

$Mg_{3.00}[Al_{0.33}(Na_{0.33})Si_{3.67}]O_{10}(OH)_2$

A natural saponite clay chemical analysis, Ency. Chem. Tech. 2nd Vol 5, p 548, is: $SiO_2$, 43.0; MgO, 23.0; $Al_2O_3$, 6.3; $Na_2O$, 1.0; CaO, 2.0; $Fe_2O_3$, 1.8; FeO, 2.6; MnO, 0.1; ingition loss, 20.5.

A synthetic saponite, Baroid Division, and a complex magnesium aluminum silicate, VEEGUM T from R. T. Vanderbilt Co., derived by refining a clay mineral, believed to be a saponite clay, are of especial interest because each goes into aqueous colloidal solution without the use of a peptizing agent.

The water insoluble inorganic silicates of lithium, sodium and potassium form aqueous colloidal solutions without the use of a peptizing agent.

The Water Insoluble Particles (Capsules)

Water insoluble particles having a size above colloidal dimensions are formed within a continuous aqueous phase when one or more of the hereinbefore deined polar group affording organic is commingled with an aqueous colloidal solution of one or more of the hereinbefore defined inorganic silicates, the inorganic silicate being present in an amount at least sufficient to form water insoluble particles. (A spherical particle would have a diameter of above about one micron.)

The size and the configuration of the water insoluble particles varies with the reaction system, with the type and degree of commingling, and with the configuration of non-reactive material which is present along with the reactive polar organic material. Usually the non-reactive material is present as a particulate solid, liquid, or semisolid and may have colloidal dimensions in the sense that the non-reactive material is in the form of a colloidal dispersion, such as, a latex.

The specific gravity of the water insoluble particles determines whether the particles drift to the top of the aqueous phase or to the bottom of the aqueous phase. "Top and bottom" are mere expressions as it has been observed that even with the finest most closely packed particles, the aqueous phase extends between the individual discrete particles as the continuous medium, that is, the particles are dispersed within a continuous aqueous phase.

In contact with the continuous aqueous phase, the water insoluble particles have a shelf life in that they do not 'dissolve' in the aqueous phase, or merge with other particles, or form compacted masses (agglomerates) which do not readily disperse back into the aqueous phase on stirring. Water insoluble particles containing the constituents of water emulsion polymer latex paints have maintained their integrity in storage at room temperature for an entire year. Some compacting of such "paint" particles does occur, but moderate agitation easily separates the particles and disperses them within the aqueous phase.

The discrete, integral natural of the individual water insoluble particles is shown by blending two or more particles, identical except for the presence of a different colored pigment. Thus paint formulations containing red particles and blue particles have been stored on the shelf for a year. The containers when agitated produced a liquid having dispersed therin discrete red particles and blue particles, which gave a two separate and distinct color pattern to the surface to which the paint was applied.

The water insoluble particles may be removed from the continuous aqueous phase, for example, by decantation or filtration, and the surface of the particle hardened. The hardening may be by simple warming at a temperature at which the material within the particle is not damaged, or at which the material does not develop enough pressure to rupture the surface of the particle. The hardened particles may or may not be readily redispersible in water dependent on the type of particle surface and the method of hardening.

Hereinafter for convenience the separated water insoluble particle is refered to as a "capsule." However, the water insoluble particles within the original aqueous phase are capsules and the separated capsules are water insoluble particles, that is, the two names are synonyms.

The capsule of this invention consists essentially of a core including as the essential component polar group affording organic material, hereinbefore defined, and enclosing said core a membrane consisting essentially of inorganic silicate, hereinbefore defined, reacted with polar groups of said polar group affording organic material, which capsule has a size above colloidal dimensions.

In the capsule art, especially the microencapsulation art, the substance(s) encapsulated is commonly referred to as the core or nucleus, less commonly as the 'payload.' The external barrier substance enclosing the core is commonly referred to as the membrane, wall, coat, or shell. Herein, the internal substance is called the core and the external barrier is called the membrane.

The core may be a single substance made up of the polar group affording organic material. Normally, the core will be made up of two or more substances, one of which is the polar group affording organic material; the other substance(s) is normally non-reactive with the inorganic silicate. The polar group affording organic material, in conjunction with a material which is non-reactive with the inorganic silicate, is commingled with the aqueous colloidal inorganic silicate solution. Commonly, the non-reactive material is particulate solid, semisolid, or liquid dispersed in the polar group affording organic material or dispersed in an aqueous solution of of the organic material.

Exemplary non-reactive materials are; water emulsion polymer latexes as described in connection with the definition of the polar group affording organic materials; particularly suitable are the water emulsion polymer latex paints (the socalled rubber base paints). Particulate fluorinated hydrocarbon polymers, usually in the form of latexes and dispersions; examples are polytetrafluoroethylene, polychlorotrifluoroethylene, polybromotrifluoroethylene, poly(vinylfluoride), and poly(vinylidenefluoride). Petroleum asphalt. Heavy duty lubricants. Ceramic frits. Pigments.

Non-reactive water immiscible liquids may be encapsulated by being conjoined with a polar group affording organic material either by being dissolved in the polar group affording organic material or by dissolving enough polar organic material to provide the capsule membrane. Illustrative liquid core substances are: hydrocarbons, such as, gasoline, kerosene, mineral spirits; essential oil for flavoring or cosmetics; inks, either liquid or semisolid.

Water is a non-reactive material. When the polar group affording organic material is dissolved in water and this solution is added to the aqueous colloidal solution of inorganic silicate, the core consists essentially of the solution of water and polar material — some inorganic silicate may enter the core. Usually the core will be an aqueous material which includes in addition to water and polar group affording organic material, a water soluble or water dispersible material such as, medicinals, flavor bodies, scents, essential oil, and the like substances.

EXAMPLE 1

Certain polar group affording organic materials were used in accordance with the procedure of Illustration II, supra.

a. Hydroxypropylcellulose (Klucel HF, Hercules Inc) behaved almost identically to hydroxyethylcellulose.

b. Sodium methylcellulose (1,500 PRG Dos Chemical) gave fine discrete brown or blue colored particles.

c. A 5 wt. percent water solution of gelatine (225 bloom) gave very fine brown or blue particles.

d. A 2 wt. percent water solution of polyacrylamide (Separan MP10) gave very elongated heavy strands, brown or blue colored.

e. A 10 wt. percent water solution of methylvinylethermaleic anhydride polymer (Gentrez AN169) gave fine brown or blue colored particles.

f. A 10 wt. percent water solution of polyvinylpyrrolidone (MPK90) gave fine brown or blue colored particles.

EXAMPLE 2

Two Teflon latexes were available (DuPont polytetrafluoroethylene); one pigmented with carbon black and the other with titanium dioxide.

a. Neither of the Teflon latexes formed particles when commingled with standard clay solution.

b. 1.5 wt. percent of guar gum (Gendrive) was dissolved into each Teflon latex. The black colored latex was added to standard clay solution in the screening procedure and fine black particles were obtained dispersed in a continuous aqueous phase. Then the white Teflon latex was added to the black particle dispersion; a multicolor dispersion of discrete black and discrete white particles was obtained within a continuous aqueous phase.

c. The multicolor Teflon particle dispersion was sprayed onto iron cooking ware and baked to produce an adherent coating of mottled black and white Teflon, resembling a black-gray enamel finish.

EXAMPLE 3

A 2 percent water solution of hydroxyethylcellulose was agitated with several grams of 'soil' taken from a flower pot, producing a dirty liquid with a large variety of soil particles distributed therein. While the soil was still well distribulted, the soiled hydroxyethylcellulose solution was added to standard clay solution; immediately the soil particles was snatched from the liquid and settled to the bottom of the aqueous phase. The soil particles were obviously coated with a membrane which prevented agglomeration and permitted the particles on the bottom of the bottle to be shaken into the bulk of the liquid, but settled rapidly after standing. The continuous aqueous phase was clear except for the faint tan color imparted by the colloidal clay in solution.

EXAMPLE 4

Turbid (muddy) water and hydroxyethylcellulose was mixed to provide a 2 percent solution of the cellulose ether. This turbid solution was added to standard clay solution; immediately water insoluble particles formed and settled from a substantially clear continuous aqueous phase.

Thus having described the invention, what is claimed is:

1. A method of forming water insoluble particles having a core consisting essentially of a polar group affording organic material and a membrane consisting essentially of an inorganic silicate surrounding and reacted with said polar group of said organic material, which method consists essentially of co-mingling polar group affording organic material and an aqueous colloidal solution of inorganic silicate, said inorganic silicate being essentially the only reactant for said polar groups and being present in an amount at least sufficient to react with polar groups of said polar group affording organic material to form water insoluble particles within a continuous aqueous phase, said particles having a size above colloidal dimensions, where
   a. said inorganic silicate is hectorite type clay; and
   b. said polar group affording organic material is characterized by the ability to form water insoluble particles having a size above colloidal dimensions when added to an aqueous colloidal solution of synthetic lithium hectorite clay and tetrasodium pyrophosphate peptizing agent, with co-mingling, which polar group affording organic material is selected from the class consisting of (i) simple organic compounds having at least one polar group, (ii) organic hydrophilic colloids, and (iii) water emulsion polymer latexes containing at least one material from (i) and (ii), excluding the water soluble cellulose ether hydrophilic colloids.

2. The method of claim 1 wherein said simple organic compound having at least one polar group is further characterized by insubstantial solubility in water at ordinary temperatures.

3. A method of forming water insoluble particles having a core consisting essentially of a polar group affording organic material and a membrane consisting essentially of an inorganic silicate surrounding and reacted with said polar group of said organic material, which method consists essentially of co-mingling polar group affording organic material and an aqueous colloidal solution of inorganic silicate, said inorganic silicate being essentially the only reactant for said polar groups and being present in an amount at least sufficient to react with polar groups of said polar group affording organic material to form water insoluble particles within a continuous aqueous phase, said particles having a size above colloidal dimensions where,
   I. said inorganic silicate is hectorite type clay; and
   II. said polar group affording organic material is characterized by the ability to form water insoluble particles having a size above colloidal dimensions when added to an aqueous colloidal solution of synthetic lithium hectorite type clay and tetrasodium pyrophosphate peptizing agent, with co-mingling, which polar group affording organic material is selected from the class consisting of
   a. simple organic compounds having at least one polar group;
   b. water soluble alkali metal carboxyalkylcellulose and water soluble alkali metal carboxyalkylhydroxyalkylcellulose;
   c. water soluble polysaccharides;
   d. water soluble proteins;
   e. the water soluble resins: poly(vinyl alcohol), poly(ethyleneimine), poly(acrylamide), polyvinylpyrrolidone, sulfonated polymers, carboxylic polymers, their esters and their alkali metal salts, and maleic copolymer derivatives;
   f. water emulsion polymer latexes containing material from at least one of the above subclasses (a) through (e); and
   g. water soluble cellulose ethers.

4. The method of claim 3 wherein said simple organic compound having at least one polar group is further characterized by insubstantial solubility in water at ordinary temperatures.

5. The method of claim 3 wherein said polar group affording material is added in conjunction with a material which is non-reactive with said inorganic silicate.

6. The method of claim 5 wherein said non-reactive material is particulate solid, semisolid, or liquid.

7. The method of claim 6 wherein said non-reactive material is added in the form of a water emulsion polymer latex.

8. The method of claim 7 wherein said latex is a part of a water emulsion polymer latex paint.

9. The method of claim 6 wherein said non-reactive material is a particulate fluorinated hydrocarbon polymer.

10. The method of claim 9 wherein said fluorinated hydrocarbon polymer is polytetrafluoroethylene.

11. The method of claim 5 wherein said non-reactive material is ceramic frit.

12. The method of claim 5 wherein said non-reactive material is liquid hydrocarbon.

13. The method of claim 5 wherein said non-reactive material is essential oil.

14. The method of claim 5 wherein said non-reactive material is liquid ink.

15. The method of claim 5 wherein said non-reactive material is an aqueous material.

16. The method of claim 15 where said aqueous material is water and polar group affording organic material.

17. The method of claim 1 wherein said clay is synthetic clay.

18. A method of forming water insoluble spheroids which method consists essentially of commingling about 25 volume parts of a liquid ester-alcohol of an eight carbon atom alkanediol and a four carbon atom alkanecarboxy acid with about 100 volume parts of an aqueous colloidal solution consisting essentially of about 3.6 weight parts of synthetic lithium hectorite type clay, 0.4 weight part of tetrasodium pyrophosphate, and the remainder water, to form water insoluble spheroids of said ester-alcohol within a continuous aqueous phase afforded by said solution, said spheroids retaining their discrete nature on storage at ordinary temperature within said continuous aqueous phase.

19. The method of claim 18 wherein said ester-alcohol includes in solution therein about 25 volume parts of petroleum mineral spirits.

20. A capsule consisting essentially of a polar group affording organic material core and enclosing said core a membrane consisting essentially only of an inorganic silicate reacted with polar groups of said polar group affording organic material, said capsule having a size above colloidal dimensions, where
   a. said inorganic silicate is hectorite type clay; and
   b. said polar group affording organic material is characterized by the ability to form water insoluble particles having a size above colloidal dimensions when added to an aqueous colloidal solution of synthetic lithium hectorite type clay and tetrasodium pyrophosphate peptizing agent, with co-mingling, which polar group affording organic material is selected from the class consisting of (i) simple organic compounds having at least one polar group, (ii) organic hydrophilic colloids, and (iii) water emulsion polymer latexes containing at least one material from (i) and (ii), excluding the water soluble cellulose ether hydrophilic colloids.

21. The capsule of claim 20 wherein said simple organic compound having at least one polar group is further characterized by insubstantial solubility in water at ordinary temperatures.

22. A capsule consisting essentially of a polar group affording organic material core and enclosing said core a membrane consisting essentially only of an inorganic silicate reacted with polar groups of said polar group affording organic material, said capsule having a size above colloidal dimensions, where
  i. said inorganic silicate is hectorite type clay; and
  II. said polar group affording material is characterized by the ability to form water insoluble particles having a size above colloidal dimensions when added to an aqueous colloidal solution of synthetic lithium hectorite type clay and tetrasodium pyrophosphate peptizing agent, with co-mingling, which polar group affording organic material is selected from the class consisting of
    a. simple organic compounds having at least one polar group;
    b. water soluble alkali metal carboxyalkylcellulose and water soluble alkali metal carboxyalkylhydroxyalkylcellulose;
    c. water soluble polysaccharides;
    d. water soluble proteins;
    e. the water soluble resins: poly(vinyl alcohol); poly(ethyleneimine); poly(acrylamide); polyvinylpyrrolidone; sulfonated polymers; carboxylic polymers, their esters and their alkali metal salts; maleic copolymer derivatives;
    f. water emulsion polymer latexes containing material from at least one of the above subclasses (a) through (e); and
    g. water soluble cellulose ethers.

23. The capsule of claim 22 wherein said simple organic compound having at least one polar group is further characterized by insubstantial solubility in water at ordinary temperatures.

24. The capsule of claim 22 wherein said core includes a material which is non-reactive with said inorganic silicate.

25. The capsule of claim 24 wherein said non-reactive material is particulate solid, semisolid, or liquid.

26. The capsule of claim 24 wherein said non-reactive material is derived from a water emulsion polymer latex.

27. The capsule of claim 26 wherein said latex is a part of a water emulsion polymer latex paint.

28. The capsule of claim 25 wherein said non-reactive material is a particulate fluorinated hydrocarbon polymer.

29. The capsule of claim 28 wherein said fluorinated hydrocarbon polymer is polytetrafluoroethylene.

30. The capsule of claim 24 wherein said non-reactive material is ceramic frit.

31. The capsule of claim 24 wherein said non-reactive material is liquid hydrocarbon.

32. The capsule of claim 24 wherein said non-reactive material is essential oil.

33. The capsule of claim 24 wherein said non-reactive material is liquid ink.

34. The capsule of claim 22 wherein said non-reactive material is an aqueous material.

35. The capsule of claim 34 wherein said aqueous material is water and polar group affording organic material.

36. The capsule of claim 20 wherein said clay is synthetic clay.

37. A water insoluble spheroid capsule consisting essentially of a core including liquid ester-alcohol of an eight carbon atom alkanediol and a four carbon atom alkanecarboxy acid and a membrane enclosing said core consisting essentially of synthetic lithium hectorite type clay reacted with polar groups of said ester-alcohol.

38. The capsule of claim 37 wherein said core includes petroleum mineral spirits dissolved in said ester alcohol.

39. The capsule of claim 25 wherein said silicate is synthetic lithium hectorite type clay.

40. The capsule of claim 20 wherein said polar group affording organic material is hydroxyethylcellulose.

41. The capsule of claim 22 wherein said silicate is synthetic lithium hectorite type clay.

42. The capsule of claim 22 wherein said polar group affording organic material is hydroxyethylcellulose.

43. The method of claim 1 wherein said silicate is synthetic lithium hectorite type clay.

44. The method of claim 1 wherein said polar group affording organic material is hydroxyethylcellulose.

45. The method of claim 3 wherein said silicate is synthetic lithium hectorite type clay.

46. The method of claim 3 wherein said polar group affording organic material is hydroxyethylcellulose.

* * * * *

UNITED STATES PATENT OFFICE
CERTIFICATE OF CORRECTION

Patent No. 3,852,076　　　　　Dated December 3, 1974

Inventor(s) Stephen Charles Grasko

It is certified that error appears in the above-identified patent and that said Letters Patent are hereby corrected as shown below:

Col. 7, line 29, "or" should read --of--. Col. 11, line 3, "pressure" should read --presence--. Claim 39, line 1 "25" should read --20--.

Signed and sealed this 18th day of February 1975.

(SEAL)
Attest:

RUTH C. MASON
Attesting Officer

C. MARSHALL DANN
Commissioner of Patents
and Trademarks